J. A. McLANE.
ATTACHMENT FOR TIRE AND TUBE MOLDS.
APPLICATION FILED JUNE 12, 1920.
1,362,717.
Patented Dec. 21, 1920.
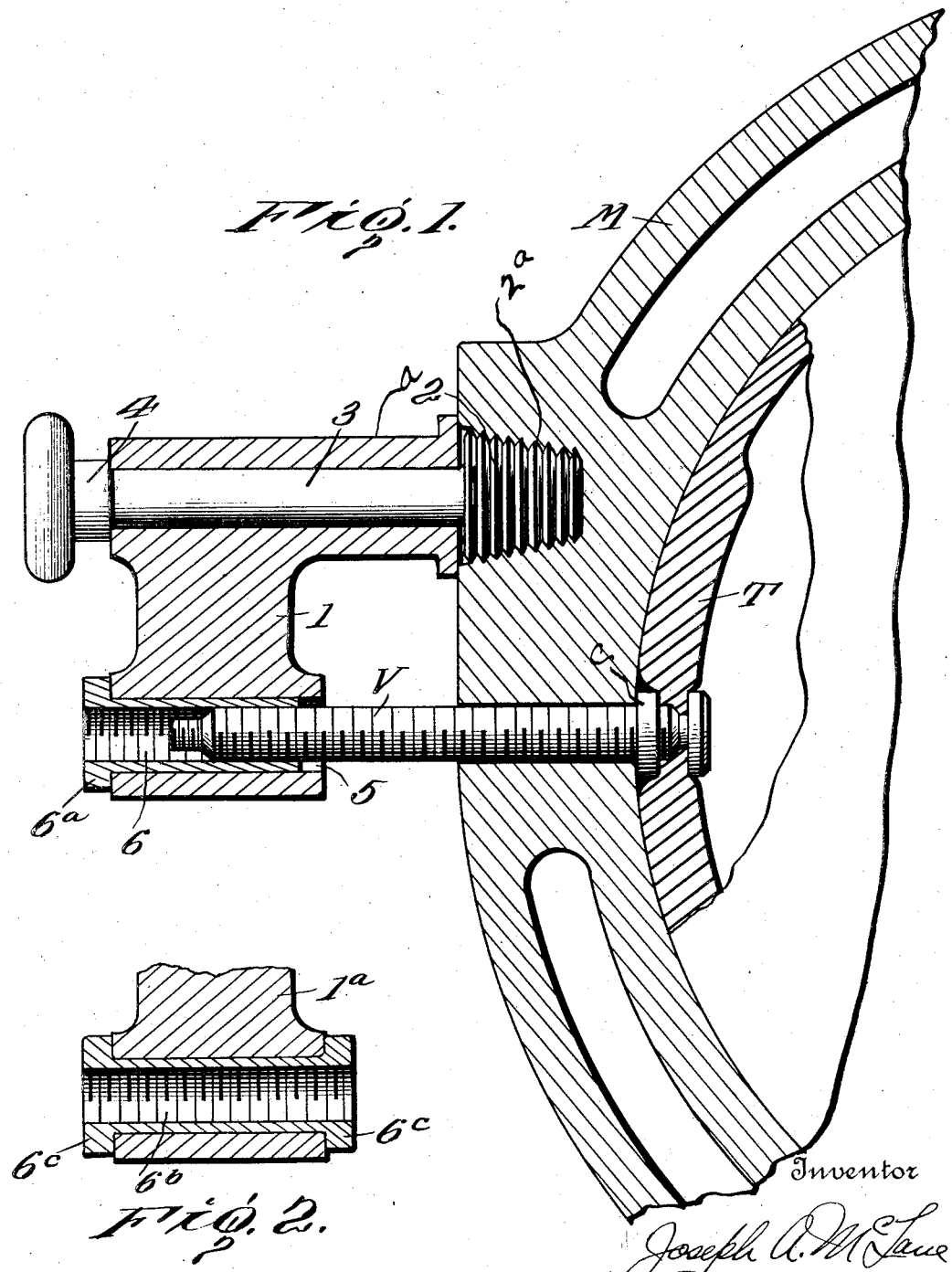

UNITED STATES PATENT OFFICE.

JOSEPH A. McLANE, OF MORGANTOWN, WEST VIRGINIA, ASSIGNOR TO THE ARMOR-CORD RUBBER COMPANY, OF MORGANTOWN, WEST VIRGINIA, A CORPORATION OF WEST VIRGINIA.

ATTACHMENT FOR TIRE AND TUBE MOLDS.

1,362,717.      Specification of Letters Patent.      Patented Dec. 21, 1920.

Application filed June 12, 1920. Serial No. 388,489.

*To all whom it may concern:*

Be it known that I, JOSEPH A. McLANE, a citizen of the United States, residing at Morgantown, in the county of Monongalia and State of West Virginia, have invented a new and useful Attachment for Tire and Tube Molds, of which the following is a specification.

The present invention is an attachment for molds, particularly designed to maintain the valve stem in proper position during the vulcanizing or curing process of inflatable tubes or tires.

Heretofore in the manufacture of certain tires or tire inner tubes, where the permanent valve stem is attached to the tube during its making or before vulcanization, it is found that the stem drops or sags from a true radial position with respect to the tube. After the tube has been vulcanized the valve stem becomes fixed in this inclined position and difficulty is often experienced in having the valve stem to properly register and extend through the opening provided therefor in a rim or felly of a wheel. In endeavoring to force these inclined or mal-positioned stems through a felly or rim, or any attempt to straighten the stem to a radial position after vulcanization or curing of the tube, causes the bond between the rubber and the stem to be broken to a degree which will permit slow leaks to occur at this point or, otherwise, causes a deformation in the tube at this point which will finally result in a leak.

It is therefore the object of this invention to overcome the above mentioned disadvantages and drawbacks and to maintain the valve stem in its proper position, usually in a true radial position relative to the tube.

The invention also has for its object a simple and economical construction for carrying out the invention, which will be durable through rough usage.

To these ends the invention consists in an attachment applicable to tire molds, including those molds now in use, which may be readily attached and detached to the mold and to the valve stem of a tire or tube contained in the latter.

Moreover, the invention further resides in the sundry details of construction and combination of elements hereinafter described.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

In the drawings:

Figure 1 is a fragmentary sectional view of the tire mold equipped with the attachment, portions of which are broken away to clearly illustrate its construction, and Fig. 2 is a fragmentary detail view of the attachment showing a further embodiment thereof.

In the specification and drawings like characters of reference denote similar and like parts.

With particular reference to the drawing, M denotes a mold of the ordinary type used in curing inner tubes indicated by T and provided with the usual valve stem V which projects through the mold.

The attachment comprises a rigid body member or block 1, preferably having a projecting portion *a* to abut the outer wall of the mold in the vicinity of the valve stem V. The abutting surfaces of the member 1 and the mold are such as will give the member a definite position relative to the mold, when secured or attached thereto.

The member may be attached to the mold in any suitable manner, but is here shown as provided with means permitting quick and ready attachment and detachment. This means consists of a rotatable tapered screw threaded plug 2 projecting from the abutting surface of the portion *a* of the member. A shank 3 carries the plug 2 on one end thereof and is rotatably mounted in the member 1, and, further, is provided with an operating handle 4 on its other end.

The shank has only a working fit with the member 1, there being loose motion, because parts 3 and 4 further prevent sliding movement of the shank. The plug 2 is receivable in a similar opening provided in the mold and it is therefore obvious that only a very slight return of the handle 4 is necessary to firmly attach or clamp the member 1 in position.

A bore 5 is formed in the member 1, preferably parallel to the shank 3 and is of a greater diameter than that of the valve stem V. An internally threaded sleeve 6 is rotatably fitted in the bore 5 and is adapted to threadedly engage the end of the valve stem V. One end of the sleeve is flanged or enlarged as at $6^a$ and preferably knurled, by which the sleeve may be manipulated.

It will therefore be seen that to apply the attachment it is only necessary to insert the plug 2 in the corresponding opening of the mold and give it a slight turn to firmly clamp the member 1 in position, care being used to have the bore 5 aline with the valve stem opening in the mold, so that the valve stem $c$ may project into the bore. The sleeve 6 is then moved to engage the valve stem and by turning it connection with the valve stem is obtained. By threading the sleeve 6 to the position shown in full lines in Fig. 1 the collar $6^a$ will abut the member 1 and cause the stem to be drawn outwardly and the face of the collar $c$ on the stem to abut the inner face of the mold. The degree to which the stem may be drawn outwardly in this manner, may be regulated as occasion requires. However, it is obvious that the engagement of the stem by the sleeve 6 carried by the member 1 will maintain the stem in its proper and desired position, which is, under ordinary conditions, in true radial alinement relative to the tube T.

The length of the extension $a$ of the member 1 is such as will permit the end of the valve stem V to enter the opening or bore 5.

In Fig. 2 is shown a modified embodiment wherein the sleeve $6^b$, corresponding to the sleeve $6^a$ in the previously described embodiment, is provided at both ends with retaining collars $6^c$ which permanently maintain the sleeve in the body member $1^a$. In this embodiment it is first necessary to thread the sleeve $6^b$ on a valve stem before the threaded plug 2 is inserted in the mold and operated to secure the member 1 in position.

From the foregoing it is apparent that with the use of the present attachment the valve stems of inner tubes or tires will not sag or move to a position inclined to the true radial alinement relative to the tube, it being understood that the opening $2^a$ in the mold is positioned and arranged to maintain the member 1 in such position that the bore 5 thereof will extend in a radial alinement relative to the tube. In some instances it may be found desirable to have the valve stem extend at a different angle and the opening $2^a$ may be accordingly positioned and arranged. However, the attachment according to this invention is designed to maintain the valve stems of tubes or tires in the proper and desired position during the vulcanization or curing of the latter in order that leaks will not occur between the tire or tube stock and a valve stem by reason of mal-positioned valve stems or deformations in the stock caused by mal-positioned valve stems.

Having thus described the invention, what is claimed is:

1. An attachment for tube molds, including body member means for securing said member to a mold and means engageable with a valve stem of the tube, containable in the mold for maintaining said stem in a determined position relatively to the tube.

2. An attachment for tube molds comprising a body member, means for detachably securing the body member to a mold, and means on said body member engageable with the valve stem of a tube containable in the mold for maintaining the stem in a determined position relatively to the tube.

3. An attachment for tube molds comprising a body member, means for securing said member to a mold, said member having an opening therein into which a valve stem of a tube containable in the mold may extend, when the member is in position, and means engageable with said valve stem when in said opening for maintaining the latter in a determined position relatively to the tube.

4. An attachment for tube molds comprising a body member, means for securing said member to a mold, said member having an opening therein into which a valve stem of a tube containable in the mold may extend, when the member is in position, and an internally threaded sleeve rotatably associated with said member in the opening thereof, said sleeve being adapted to threadedly engage said valve stem for adjusting and maintaining the latter in a determined position relatively to the tube.

5. An attachment applicable to tube molds in the vicinity of the valve opening therein and comprising a rigid body member having means for rigidly securing it in position to a mold, and rotatable means mounted in said body member and engageable with the valve stem of a tube containable in the mold for adjusting and maintaining the valve stem in a determined position relatively to the tube and said mold.

6. An attachment for tube molds of the character described comprising a body member, a manually operable screw rotatably mounted on the body member and engageable in a corresponding threaded opening in a mold arranged in the vicinity of the valve stem opening in the mold, said body member having an opening therein adapted to aline with the valve stem opening of the mold, when secured in position, to receive the valve stem of a tube containable in the mold, and an internally threaded sleeve rotatably disposed in said opening for threaded engagement with said valve stem for adjusting the latter and positively maintaining it in a determined position relatively to the tube and said mold.

7. An attachment for tube molds of the character described comprising a rigid body member having a bearing surface to abut a surface of a mold in the vicinity of a valve stem opening in the latter, means engageable with the mold for clamping the said bearing surface of the member to the mold, an internally threaded sleeve carried by the said member to aline with the valve stem opening in the mold, when the attachment is secured in position, and to threadedly engage the valve stem of a tube containable in the mold, said sleeve being rotatable in said member whereby the valve stem may be adjusted and maintained to a determined position relatively to the mold and the tube.

8. The combination with a tire or tube mold, of means engageable with the valve stem of the tire or tube within the mold for maintaining said stem in a determined position relative to the tire or tube during the curing operation of the latter.

9. The combination with a tire or tube mold having an opening therein through which a valve stem may extend, of an attachment therefor having means for securing it to the mold and means for maintaining said valve stem in a determined position relatively to the tire or tube and said mold during the vulcanization of the tire or tube.

10. The combination with a tube mold having a valve stem opening therein, of an attachment therefor comprising a rigid body member having a bearing surface engageable with a surface of the mold in the vicinity of the valve stem opening therein, a lock member projecting from the bearing surface of said body member and engageable with a coöperating lock member on the mold, means for manually operating said lock member, said body member having an extension formed with a bore to aline with the valve stem opening in the mold, when said attachment is secured in position, and a sleeve rotatably mounted in said bore and internally threaded to engage a valve stem projecting through the opening in the mold, whereby the valve stem may be adjusted and maintained in a determined position relatively to its tube and the mold.

11. The combination with a tube mold having a valve stem opening therein, of an attachment therefor comprising a rigid body member having a bearing surface engageable with a surface of the mold in the vicinity of the valve stem opening therein, a tapered threaded screw member projecting from said bearing surface of the body member and receivable in a recess in the mold, means for manually operating said screw member, said body member having an extension formed with a bore to aline with the valve stem opening in the mold, when said attachment is secured in position, and a sleeve rotatably mounted in said bore and internally threaded to engage a valve stem of a tube containable in the mold, at least the end of the sleeve remote from the mold being provided with a retaining member to prevent its sliding movement in said bore, whereby the valve stem may be adjusted and maintained in a determined position relatively to the tube and mold.

In testimony whereof I have hereunto set my hand.

JOSEPH A. McLANE.